June 4, 1929.  A. A. MacCUBBIN  1,716,072

COATING MACHINE

Filed July 13, 1922  2 Sheets-Sheet 1

INVENTOR
Alexander A. MacCubbin
BY
Chas. W. Mortimer
ATTORNEY

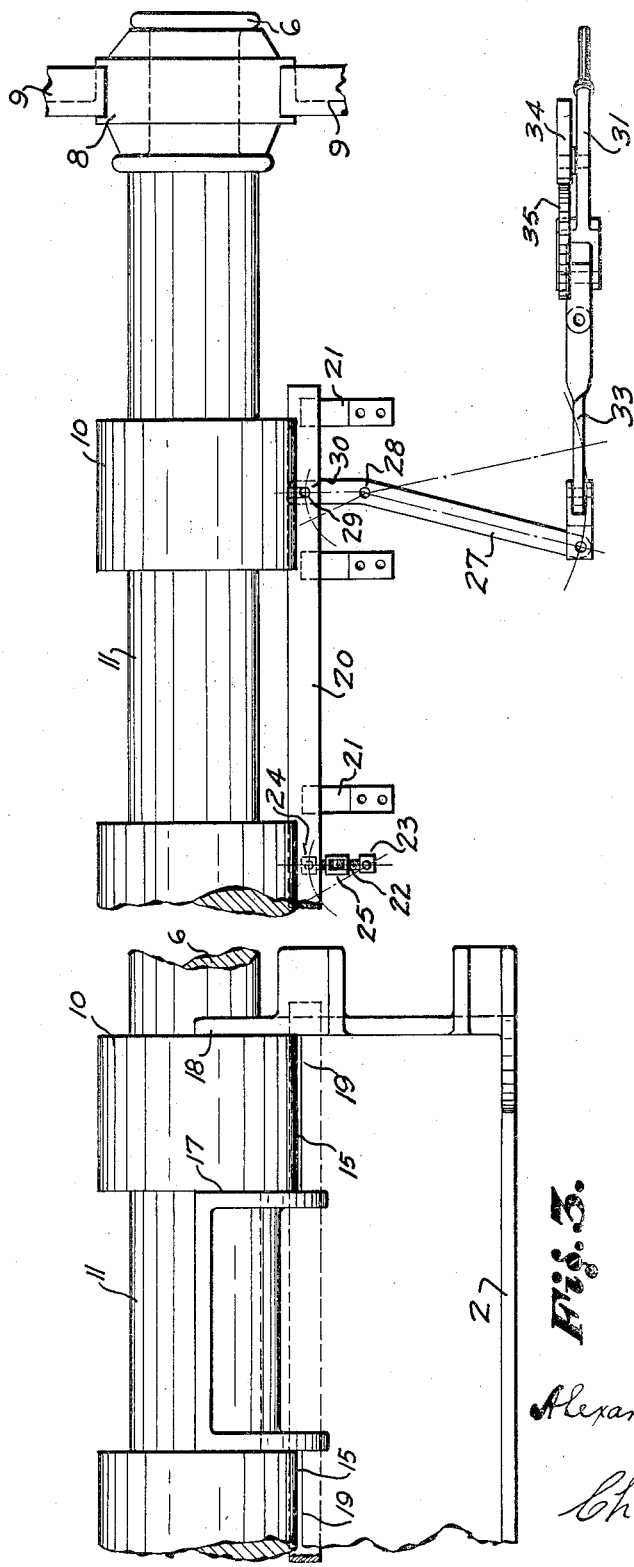

Patented June 4, 1929.

1,716,072

UNITED STATES PATENT OFFICE.

ALEXANDER A. MacCUBBIN, OF PHILADELPHIA, PENNSYLVANIA, ASSIGNOR TO THE BARRETT COMPANY, A CORPORATION OF NEW JERSEY.

COATING MACHINE.

Application filed July 13, 1922. Serial No. 574,633.

In the manufacture of shingles from sheets of material which usually have a base of fibrous material saturated with waterproofing material, it is sometimes desirable to apply strips or layers of plastic material to one or both sides of the sheet, which strips are to be of less width than the width of the sheet itself. Such plastic materials may have wear-resisting material, such as crushed stone, slate, etc., applied thereto and the sheet may be subsequently cut into shingles or shingle strips having certain portions thicker than others, thereby obtaining desirable results.

The present invention makes provision whereby such strips of plastic material may be conveniently and rapidly applied to sheets of the sort used in this art. The invention will be understood from the description in connection with the drawings, in which—

Fig. 3 is a plan view of the same; and

Fig. 4 is a view showing a portion of the feed regulating mechanism, all of the views being partly broken away to avoid the duplication of parts.

Figure 2:
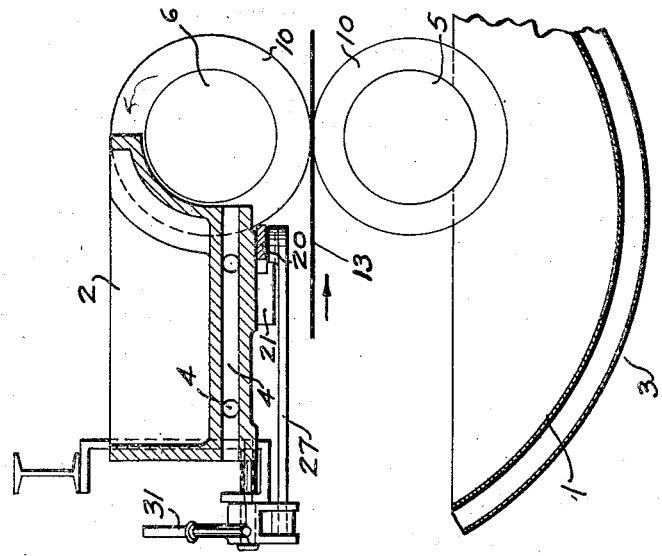
Fig. 2 is an end view of the same partly in section.
Figure 1:
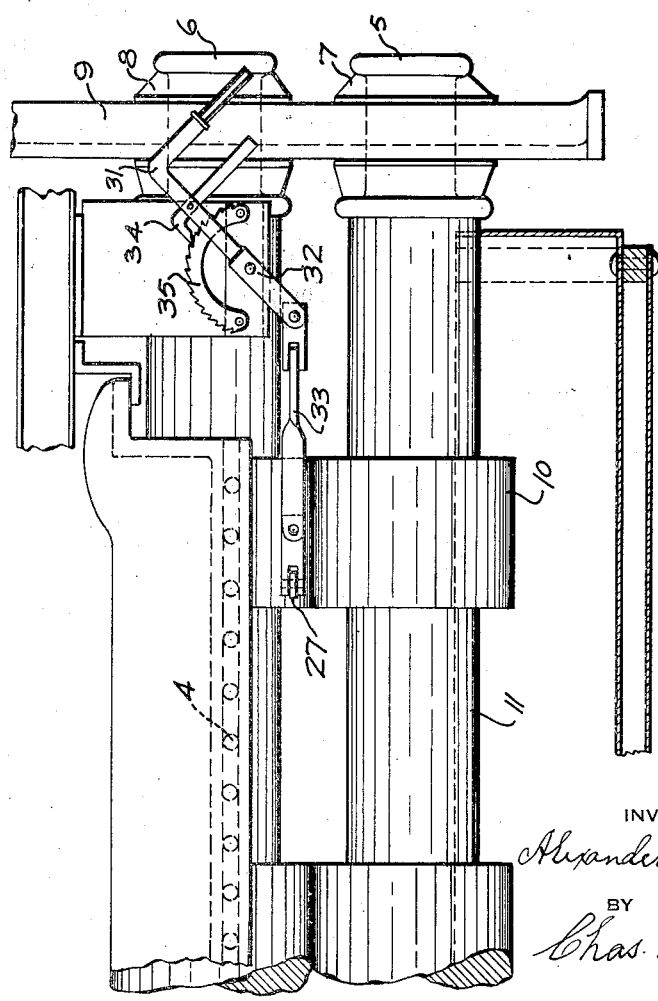
Fig. 1 is a side view of the device.

In the drawings reference characters 1 and 2 represent pans or containers for plastic coating material, such as pitch or asphalt, for roofing sheets. The pan 1 is provided with a jacket 3 so that heating fluids may be circulated therethrough for keeping the material in a liquid condition, and the pan 2 is also provided with conduits 4 for like purposes.

Coating rolls 5 and 6 are mounted in bearings 7 and 8 which are held in guides 9 and are adjustable to different heights and are to be driven in opposite directions by any convenient means not shown. These rolls 5 and 6 have alternate enlarged cylindrical portions 10 and smaller cylindrical portions 11, the portions 10 corresponding in length to the width of the plastic material, which it is desired to apply to the roofing sheet. The roll 5 dips into the pan 1 and the plastic material in this pan may be kept at different heights so that the enlarged portions 10 of the roll 5 will dip into the same to the desired extent to cause the desired quantities of plastic material to be picked up and applied in strips to the lower side of the sheet 13. The roll 5 may also be adjusted in guides 9 so as to regulate the extent to which the portions 10 dip into the plastic material.

The upper pan 2 is provided along one edge with openings 15, as more clearly shown in Fig. 3, the length of these openings corresponding to the length of the enlarged portions 10 of the roll 6. The walls 17 and 18 of these openings fit the ends of the enlarged portion 10 sufficiently close to prevent plastic material from escaping, and the edges 19 of the bottom of the pan 2 near the lower extremity of the openings 15 are sufficiently far from the periphery of the portions 10 to permit the escape of as thick a layer or sheet of plastic material as will ever be required. The bottom of the pan 2 is provided with a plate or supplementary bottom 20 parallel with the roll 6 and adjustable to different distances therefrom. This plate 20 is held by guides 21 and is swung on parallel rods 22 (only one of which is shown at Fig. 4), which rods are pivoted about fixed pivots 23 at one end and are pivoted at 24 to the plate 20 at the other end, these rods 22 being adjustable in length by means of the turnbuckles 25. The plate 20 is moved toward or away from the roll 6 for the purpose of varying the opening between its edge and the periphery of the portions 10 for the purpose of regulating the thickness of the escaping layer of plastic material. This adjustment is accomplished by means of a bar 27 pivoted at 28 and having a slotted end 29 operating about the pin 30 in the plate 20. The bar 27 is swung by means of the lever 31 pivoted at 32 and attached by means of the strap 33 to the bar 27. The lever 31 is also provided with the pawl 34 which drops into the notches of the ratchet 35 and is thereby held in the adjusted positions.

The operation is as follows:

The pans 1 and 2 will be supplied with plastic material and the same will be heated to keep the same in a sufficiently liquid state. The rolls 5 and 6 will be driven in the usual manner well known in this art, and the sheet 13 of roofing material to be coated will be drawn between the rolls in the direction of the arrow by ordinary pull rolls that are customarily used. The roll 5 will apply strips of plastic material to the lower side of the sheet 13, and the roll 6 will apply strips to the upper side of the same, the height of the liquid in pan 1 regulating the thickness on the lower side and the position of the plate 20 regulating the thickness of the plastic material on the upper side. This plastic material may then have applied thereto crushed mineral material in the usual way, after which the sheet may be cut up into shingles.

It will be understood that the strips of plastic material may be applied to only one side, if desired; also the strips of plastic material may be applied on the respective sides in staggered relation to each other by changing the relative positions of the enlarged portions 10 of the rolls 5 and 6. The sheet 13 may be coated on one or both sides with the layers of plastic and wear-resisting material before passing the same through this machine, in which case the narrow strips or layers of plastic material will be superposed on the first layers.

I claim:—

1. In a coating machine, an upper and a lower coating roll each having enlarged portions constituting less than one-half the length of said rolls, said enlarged portions being alined with each other, and means adjacent the peripheral face of the upper roll for varying the thickness of the coating material supplied thereto.

2. In a coating machine, a pan for coating material, a coating roll having enlarged portions extending into said pan and a pivoted plate below said pan for regulating the amount of coating material supplied from said pan to said roll.

3. In a coating machine, a pan for coating material, a coating roll having portions of different diameters, the portions of larger diameter being shorter than the portions of smaller diameter, and means including said pan for supplying and regulating the quantity of the coating material to the portions of larger diameter only, a portion of said pan preventing access of coating material to the portions of smaller diameter.

4. In a coating machine, a pan having an opening in the side thereof, a coating device extending into said opening, a supplementary bottom for a portion of said pan pivoted below said pan and means for adjusting said bottom to different distances from said coating device.

5. In a coating machine, a stationary coating pan having an opening in the side thereof, a coating element extending into said opening, a rectangular opening between the bottom of said pan and said element and a plate pivoted to a lever in proximity to said opening for varying the width of said opening.

6. In a coating machine, two coating rolls each having enlarged portions alined with each other and a coating material pan adjacent each roll, the enlarged portions only of each roll extending into its respective coating pan.

7. In a coating machine, two coating rolls each having enlarged portions alined with each other and a coating material pan adjacent each roll, the enlarged portions only of each roll extending into its respective coating pan, and separate means for regulating the thickness of coating taken up by each roll.

8. In a coating machine, a stationary coating pan, a coating roll at least partially extending into said pan and having enlarged portions thereon and means for regulating the thickness of the coating upon said roll including the regulation of the depth of coating material in said pan.

9. In a coating machine, coating material pans, coating rolls each having enlarged portions alined one with the other and extending into its respective coating pan and selectively operable means for each pan for regulating the thickness of coating taken up by each roll and for optionally preventing any of the rolls from taking up coating material.

In testimony whereof I affix my signature.

ALEXANDER A. MacCUBBIN.